United States Patent [19]

Sorrentino et al.

[11] Patent Number: 4,482,449
[45] Date of Patent: Nov. 13, 1984

[54] REFORMING WITH A CATALYST CONTAINING A GROUP VIII NOBLE METAL, A GROUP VIII NON-NOBLE METAL, AND GALLIUM ON SEPARATE SUPPORT PARTICLES

[75] Inventors: Cecelia M. Sorrentino, Naperville, Ill.; Regis J. Pellet, Croton-On-Hudson, N.Y.; Ralph J. Bertolacini, Naperville, Ill.

[73] Assignee: Standard Oil Company (Indiana)

[21] Appl. No.: 595,278

[22] Filed: Mar. 30, 1984

Related U.S. Application Data

[62] Division of Ser. No. 533,145, Sep. 16, 1983.

[51] Int. Cl.$^3$ ............................................ C10G 35/085
[52] U.S. Cl. ...................................... 208/139; 208/65; 208/138
[58] Field of Search ............................... 208/138, 139

[56] References Cited

U.S. PATENT DOCUMENTS

| | | | |
|---|---|---|---|
| 2,814,599 | 11/1957 | LeFrancois et al. | 502/328 |
| 3,772,183 | 11/1973 | Bertolacini et al. | 208/65 |
| 3,772,184 | 11/1973 | Bertolacini et al. | 208/65 |
| 4,048,249 | 9/1977 | Antos | 208/139 |
| 4,325,808 | 4/1982 | Kim et al. | 208/65 |

Primary Examiner—Curtis R. Davis
Attorney, Agent, or Firm—James L. Wilson; William T. McClain; William H. Magidson

[57] ABSTRACT

The catalyst comprises a physical particle-form mixture of a Componet A, a Component B, and a Component C, said Component A comprising at least one Group VIII noble metal, preferably platinum, deposed on a solid catalyst support material providing acidic catalytic sites, said Component B comprising a small amount of a non-noble metal of Group VIII selected from cobalt, nickel, and mixtures thereof, preferably cobalt, on a solid catalyst support material providing acidic catalytic sites, said Component C comprising a small amount of gallium deposed on a solid catalyst support material providing acidic catalytic sites, and said catalyst having been prepared by thoroughly and intimately blending finely-divided particles of said Component A, B, and C to provide a thoroughly-blended composite.

The catalyst can be employed suitably in a hydrocarbon conversion process. In particular, the catalyst can be employed in a process for the reforming of a hydrocarbon stream, which process comprises contacting said stream in a reforming zone under reforming conditions and in the presence of hydrogen with said catalyst. The process can be used advantageously to reform a hydrocarbon stream that contains up to 80 ppm sulfur.

11 Claims, 5 Drawing Figures

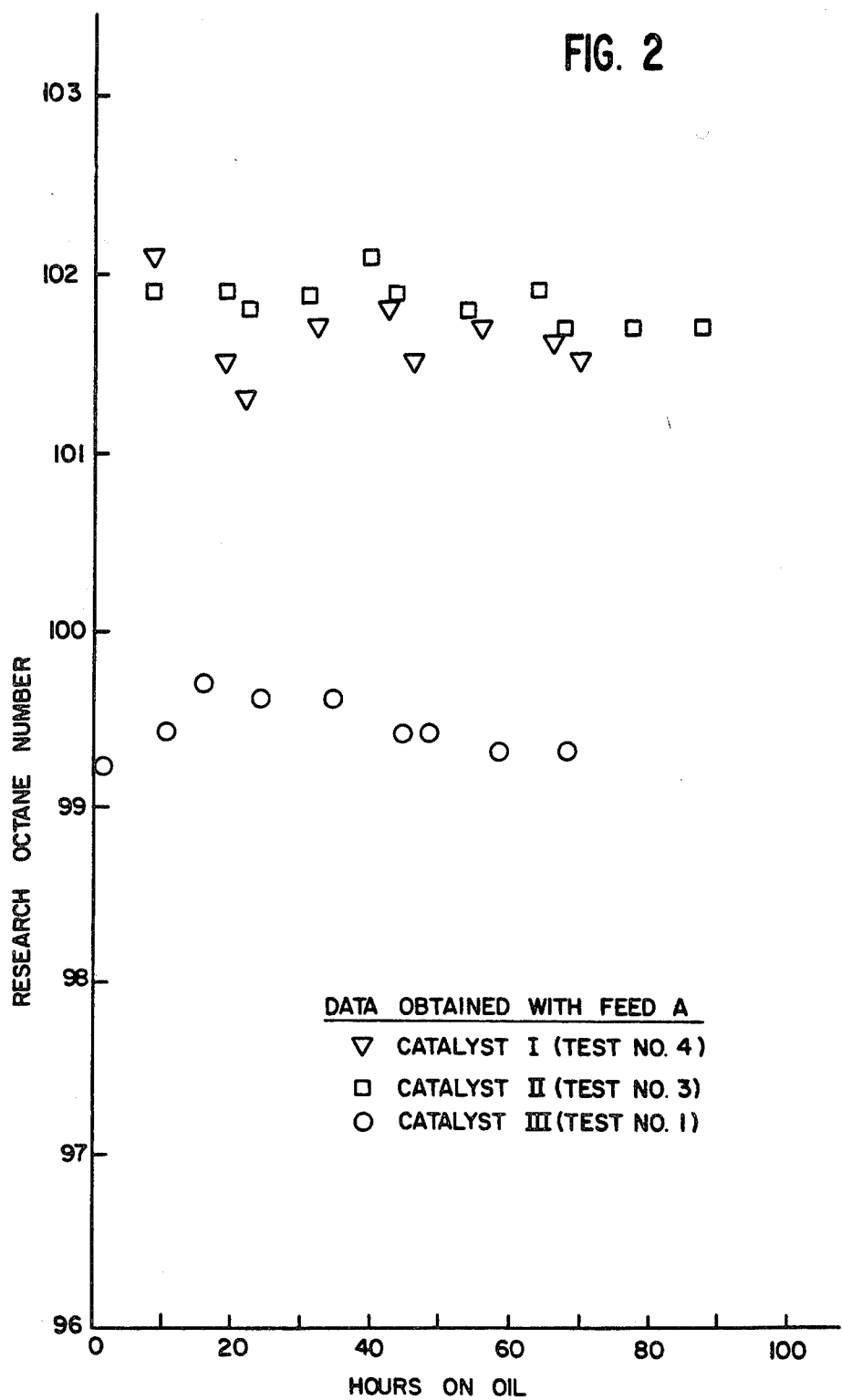

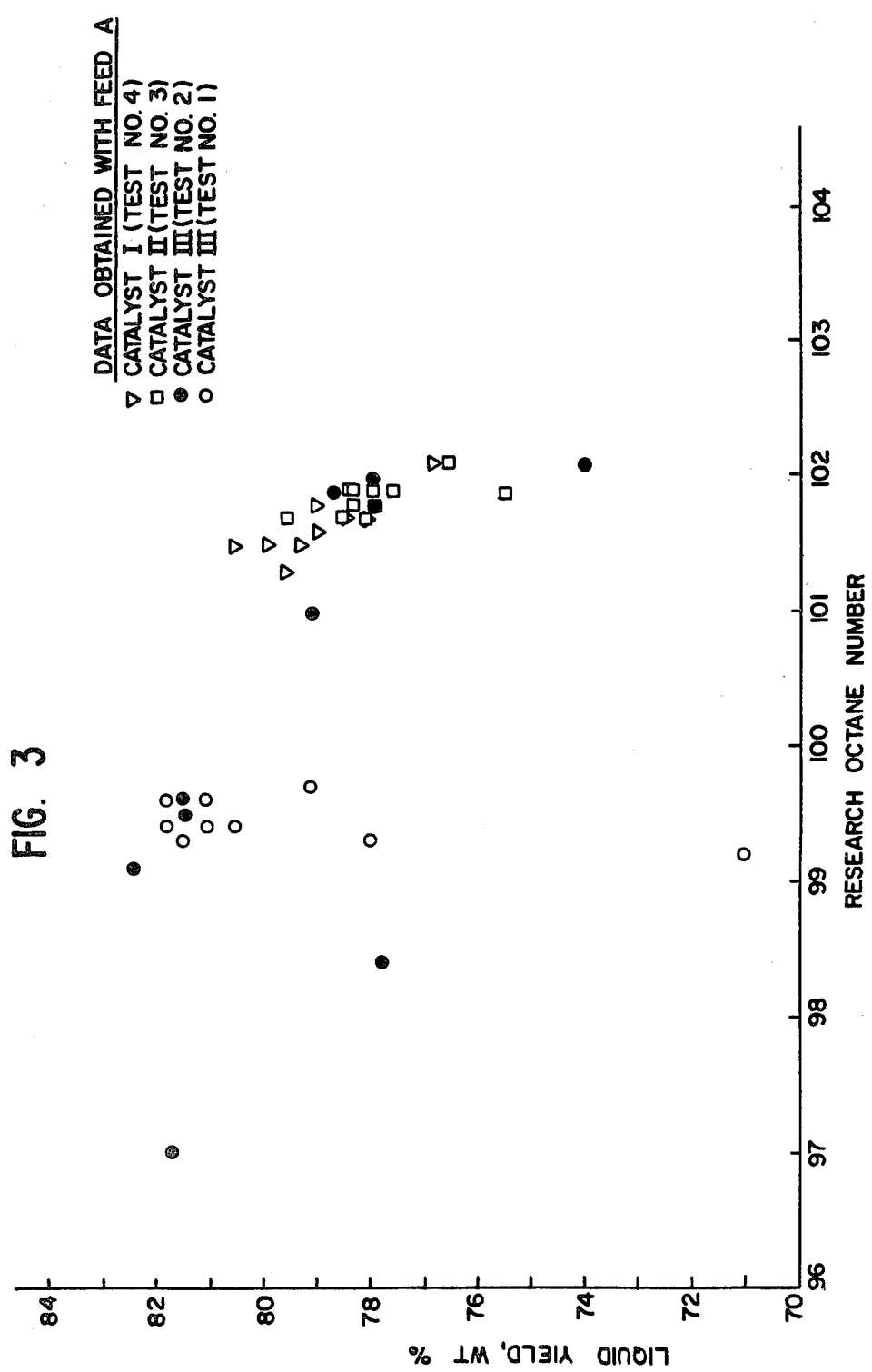

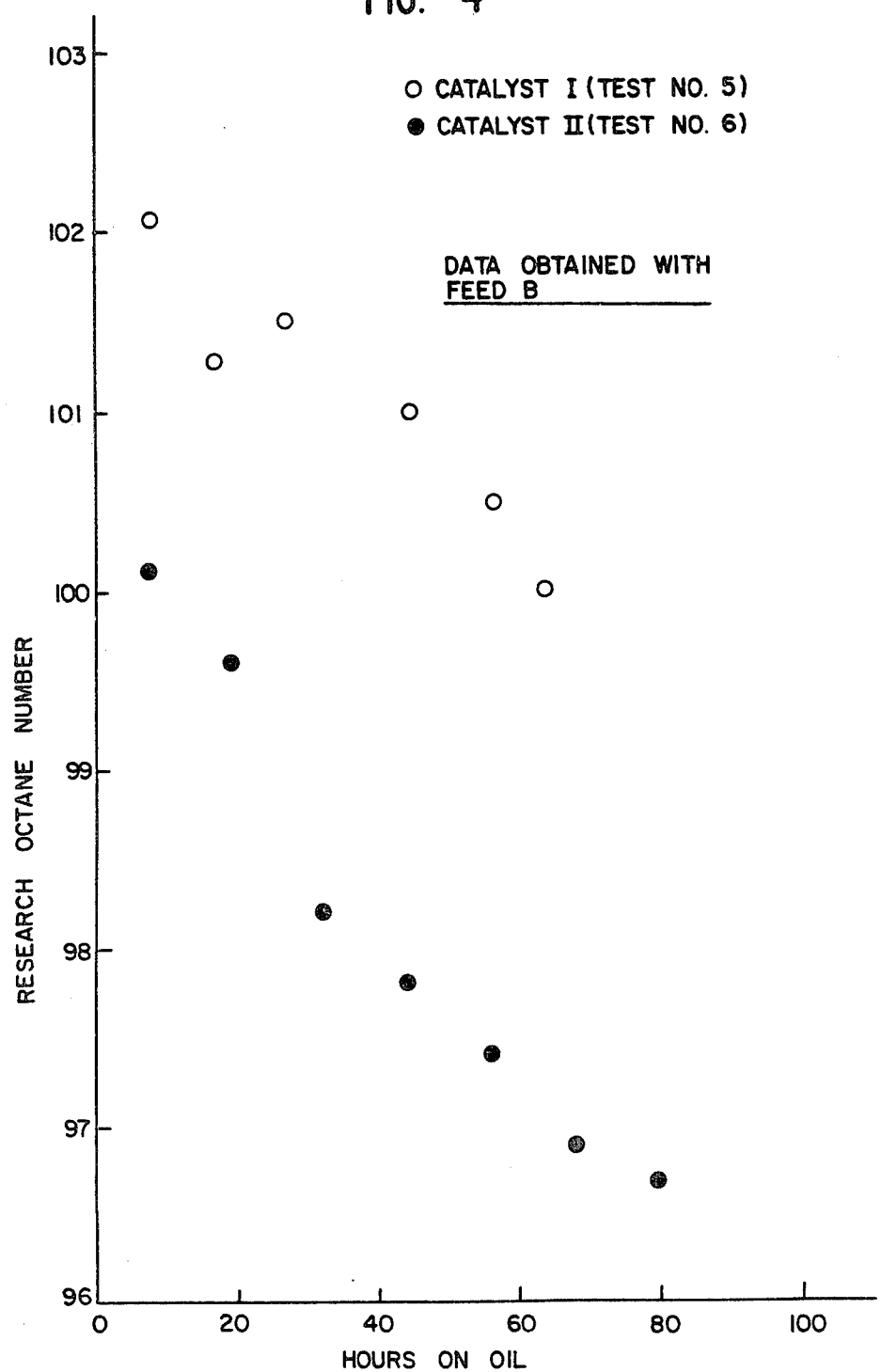

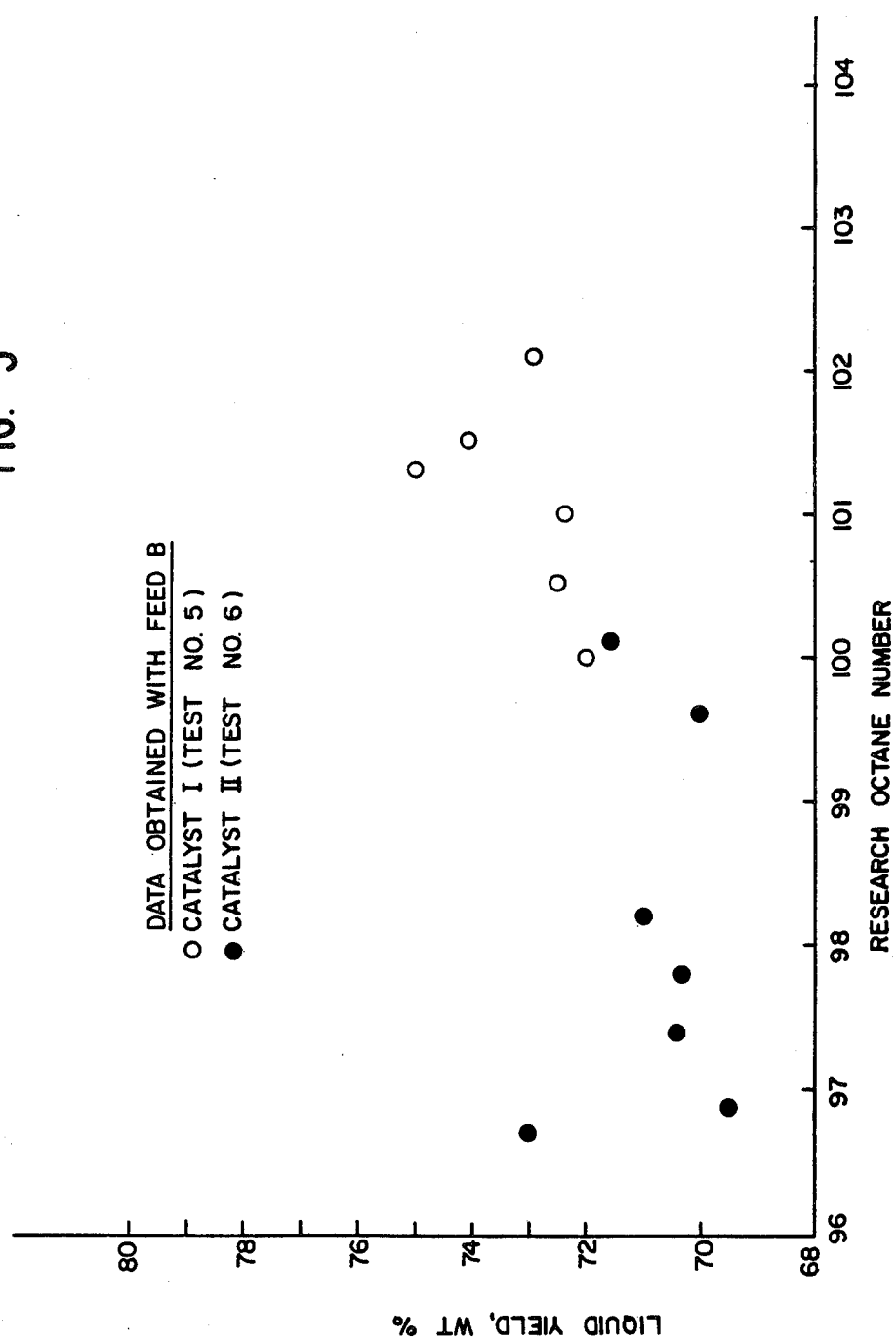

REFORMING WITH A CATALYST CONTAINING A GROUP VIII NOBLE METAL, A GROUP VIII NON-NOBLE METAL, AND GALLIUM ON SEPARATE SUPPORT PARTICLES

This is a division of application Ser. No. 533,145, filed Sept. 16, 1983.

CROSS-REFERENCE TO RELATED APPLICATION

An application is being filed concurrently herewith. This application, U.S. Ser. No. 595,292, is directed to a catalyst and to hydrocarbon conversion processes employing that catalyst, e.g., a reforming process. The catalyst comprises a physical particle-form mixture of a Component A and a Component B, said Component A comprising at least one Group VIII noble metal deposed on a solid catalyst support material providing acidic catalytic sites, said Component B comprising a small amount of gallium deposed on a solid catalyst support material providing acidic catalytic sites, and said catalyst having been prepared by thoroughly and intimately blending finely-divided particles of said Components A and B to provide a thoroughly-blended composite.

BACKGROUND OF THE INVENTION

The reforming of petroleum hydrocarbon streams is one of the important petroleum refining processes that may be employed to provide high-octane number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussions of the reactions occurring in a reforming reaction zone are presented in CATALYSIS, Vol. VI, P. H. Emmett, editor, Reinhold Publishing Corporation, 1958, pages 497–498, and PETROLEUM PROCESSING, R. J. Hengstebeck, McGraw-Hill Book Company, Inc., 1959, pages 179–184.

It is well-known by those skilled in the art that several catalysts are capable of reforming petroleum naphthas and hydrocarbons that boil in the gasoline boiling range. Although reforming may be carried out through the use of molybdena-on-alumina catalysts, chromium-oxides-on-alumina catalysts, platinum-halogen-on-alumina catalysts, and platinum-aluminosilicate-material-alumina catalysts, the catalysts employing platinum as a hydrogenation component are generally employed today in the reforming processes of the petroleum industry.

It is known by those skilled in the art that gallium can be used to promote a platinum-containing reforming catalyst. In U.S. Pat. No. 2,814,599, Lefrancois, et al., teach that a platinum-containing reforming catalyst can be promoted with a small amount of gallium. In U.S. Pat. Nos. 3,772,183 and 3,772,184, Bertolacini, et al., disclose reforming processes employing two catalysts. In each case, the first catalyst in the system can be a catalyst that comprises a platinum-group-metal hydrogenating component, a halide, and optionally a small amount of rhenium on a catalytically-active alumina. In U.S. Pat. No. 3,772,183, an embodiment of the second catalyst comprises a Group VIII noble metal, about 0.05 to 3 wt% gallium, and optionally a halide on a solid catalytic support, particularly catalytically-active alumina. In U.S. Pat. No. 3,772,184, an embodiment of the second catalyst comprises a Group VIII noble metal as a hydrogenating component, about 0.05 wt% to about 3 wt% rhenium, about 0.05 wt% to about 3 wt% gallium, and optionally a halide on a porous refractory inorganic oxide, particularly catalytically-active alumina. In addition, Bertolacini, et al., in U.S. Pat. No. 3,772,184, teach a single-catalyst reforming process which employs as its catalyst the second catalyst of the above-described two-catalyst system of that reference. In U.S. Pat. No. 4,325,808, Kim, et al., disclose a catalyst system comprising a physical particle-form mixture of two catalysts, the first catalyst comprising at least one noble metal component, preferably platinum, and a combined halogen on a refractory inorganic oxide and being free of a crystalline aluminosilicate component, and the second catalyst being free of a noble metal and comprising at least one metal component deposed on a solid support comprising a crystalline aluminosilicate material dispersed in a refractory inorganic oxide. The metal of the second catalyst of this system can be gallium or rhenium. In U.S. Pat. No. 4,048,249, Antos discloses a multimetallic catalytic composition comprising a combination of catalytically-effective amounts of a platinum group component, a gallium component, a cobalt component, and a halogen component on a porous carrier material. Antos discloses further that the catalyst of his invention is suitable for the dehydrocyclization of dehydrocyclizable hydrocarbons and that particularly good results are obtained when the catalyst is prepared and maintained during use in a substantially sulfur-free state. Of course, in such case, the use would be conducted in a substantially sulfur-free environment.

Now there has been found a reforming catalyst containing a Group VIII noble metal, a Group VIII non-noble metal, and gallium on separate support particles, which catalyst provides superior performance when it is used for the reforming of a feedstock containing sulfur.

SUMMARY OF THE INVENTION

Broadly, according to the present invention, there is provided a catalyst for the conversion of a hydrocarbon stream, particularly for the reforming of a hydrocarbon stream, which catalyst comprises a physical particle-form mixture of a Component A, a Component B, and a Component C, said Component A comprising at least one Group VIII noble metal deposed on a solid catalyst support material providing acidic catalytic sites, said Component B comprising a small amount of a non-noble metal of Group VIII selected from cobalt, nickel, and mixtures thereof deposed on a solid catalyst support material providing acidic catalytic sites, said Component C comprising a small amount of gallium deposed on a solid catalyst support material providing acidic catalytic sites, and said catalyst having been prepared by thoroughly and intimately blending finely-divided particles of said Components A, B, and C to provide a thoroughly-blended composite. The solid catalyst support materials of Component A, Component B, and Component C can be the same material or different materials. Suitably, Components A, B, and C can employ a support material comprising a catalytically-active alumina and a combined halogen. Preferably, the combined halogen is chlorine and the Group VIII noble metal is platinum. The Group VIII noble metal is present in an amount within the range of about 0.1 wt% to about 3 wt%, calculated as the element and based upon the weight of Component A. The cobalt, nickel, or mixture thereof is present in Component B in an amount within the range of about 0.1 wt% to about 4 wt%, calculated as the element and based upon the weight of Component B. The gallium is present in Component C in an amount within the range of about 0.1 wt% to about 4 wt%, calculated as the element and based upon the weight of Component C. The combined halogen is present in an amount within the range of about 0.1 wt% to about 4 wt%, calculated as the element and based upon the weight of the particular component. Each component of this catalyst, i.e., Component A, Component B, or Component C, is present in an amount within the range of about 25 wt% to about 50 wt%, based upon the weight of the catalyst. Preferably, each component makes up one-third of the catalytic composition.

According to the invention, there is provided also a process for the conversion of a hydrocarbon stream. Specifically, there is provided a process for the reforming of a hydrocarbon stream, which process comprises contacting said stream in a reforming zone under reforming conditions and in the presence of hydrogen with the catalyst described hereinabove. The process can be used advantageously to reform a hydrocarbon stream that contains up to about 80 ppm of sulfur.

BRIEF DESCRIPTION OF THE DRAWINGS

FIG. 2 compares the research octane numbers obtained from three reforming test runs, each of which runs employed a different catalyst to reform a feedstock that is substantially sulfur-free.

FIG. 3 presents the liquid yields obtained from the same three test runs and another run.

FIG. 4 compares the research octane numbers obtained from a reforming test run employing an embodiment of the catalyst of the present invention to those obtained from another reforming test run that employed a catalyst having platinum, cobalt, and gallium co-impregnated onto the gamma-alumina support, each of these two test runs reforming a feedstock containing 58 ppm sulfur.

FIG. 5 compares the liquid yields obtained from the latter two test runs.

DESCRIPTION AND PREFERRED EMBODIMENTS

Figure 1:
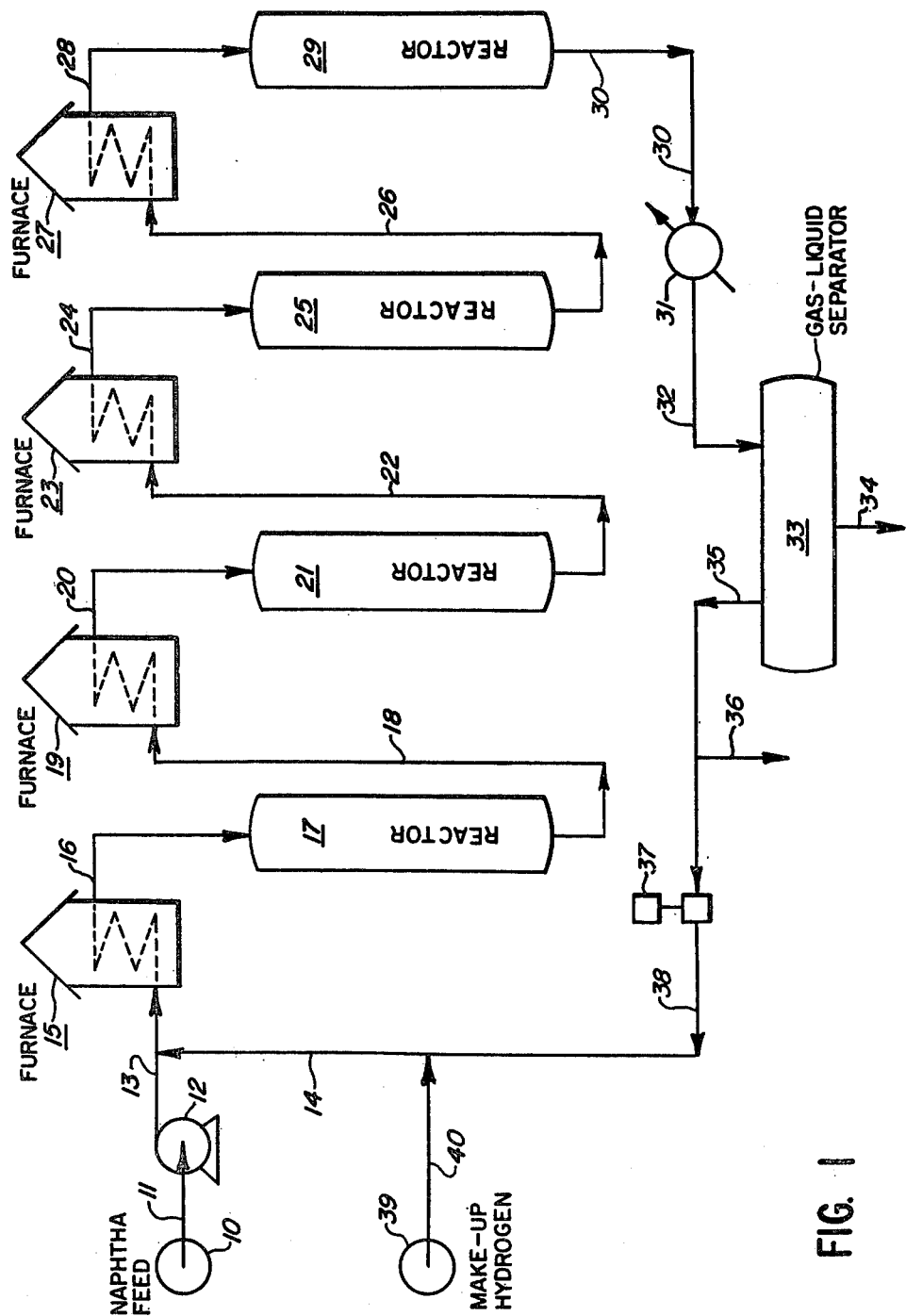
FIG. 1 presents a simplified schematic flow diagram of a preferred embodiment of the process of the present invention, which embodiment employs the catalyst of the present invention.

The highly mechanized society of today requires an increasing demand for very high-octane number motor fuels. One of the chief processes for achieving such motor fuels is the reforming process. Typically, the reforming process of today is a process that employs a catalyst containing both platinum and rhenium as active metal components thereof. Such catalysts provide relatively long catalyst life interspersed with infrequent regenerations.

The process of the present invention is especially advantageous for the production of high-octane number blending components for motor fuels by means of the reforming of naphthas and other hydrocarbon streams boiling in the gasoline boiling range. It can be employed suitably to produce high-octane number blending components for unleaded and/or low-lead motor fuels.

The process of the present invention can be employed to reform a feedstock which is a member selected from the group consisting of a virgin naphtha, a cracked naphtha, a hydrocarbon fraction boiling in the gasoline boiling range, and mixtures thereof. It can be used also to reform partially-reformed naphthas and other hydrocarbon streams. A naphtha will exhibit a boiling range of about 21.1° C. (70° F.) to about 260° C. (500° F.), preferably, about 82° C. (180° F.) to about 204° C. (400° F.). The gasoline boiling range comprises temperatures of about 49° C. (120° F.) to about 216° C. (420° F.), preferably, about 60° C. (140° F.) to about 193° C. (380° F.). The partially-reformed hydrocarbon streams will exhibit an unleaded research octane number within the range of about 75 to about 95. As used herein, the term "partially-reformed" refers to those streams that have been reformed to an unleaded research octane number of about 75 to about 95.

Since many of the above feedstocks may contain appreciable amounts of nitrogen and sulfur compounds, which can be deleterious to the catalyst in a reforming process, such feedstock is often subjected to a suitable hydrodesulfurization and/or hydrodenitrogenation treatment, such as hydrofining, prior to the use of that particular feedstock in the process of the present invention. Such treatment reduces both the nitrogen and sulfur levels to tolerable limits. However, it is to be emphasized that the process of the present invention can be used suitably to reform a hydrocarbon stream that contains as much as 80 ppm of sulfur by weight. The process can be used preferably to reform a hydrocarbon stream that contains as much as 15 ppm sulfur by weight.

Typical catalysts that can be used in the hydrodesulfurization and/or hydrodenitrogenation treatment comprise a suitable hydrogenation component, such as a Group VIB metal of the Periodic Table of Elements and/or a Group VIII metal of the Periodic Table of Elements, deposited on a suitable non-acidic or weakly-acidic support material, such as catalytically-active alumina. The Periodic Table of Elements referred to herein is the Periodic Table that appears on page 628 of WEBSTER'S SEVENTH NEW COLLEGIATE DICTIONARY, G. & C. Merriam Company, Springfield, Mass., U.S.A. (1963). Typical hydrogenation components are present in the elemental form, as oxides of the metals, as sulfides of the metals, or mixtures thereof. Examples of these pretreatment catalysts are compounds of cobalt and molybdenum on alumina and compounds of nickel and molybdenum on alumina.

Operating conditions for the hydrodesulfurization and/or hydrodenitrogenation treatment comprise an average temperature within the range of about 316° C. (600° F.) to about 399° C. (750° F.); a pressure within the range of about 1,480 kPa (200 psig) to about 3,546 kPa (500 psig); a liquid hourly space velocity (LHSV) within the range of about 1 volume unit of hydrocarbon per hour per volume unit of catalyst to about 5 volume units of hydrocarbon per hour per volume unit of catalyst; a hydrogen-to-hydrocarbon mole ratio within the range of about 1 to about 5; and a hydrogen addition rate within the range of about 17.8 m$^3$/m$^3$ (100 standard cubic feet of hydrogen per barrel of hydrocarbon [SCFB]) to about 89.0 m$^3$/m$^3$ (500 SCFB).

Broadly, according to the present invention, there is provided a catalyst for the conversion of a hydrocarbon stream, which catalyst comprises a physical particle-form mixture of a Component A, a Component B, and a Component C, said Component A comprising at least one Group VIII noble metal deposed on a solid catalyst support material providing acidic catalytic sites, said Component B comprising a small amount of a non-noble metal or Group VIII selected from cobalt, nickel, and mixtures thereof deposed on a solid catalyst support material providing acidic catalytic sites, said Component C comprising a small amount of gallium deposed on a solid catalyst support material providing acidic catalytic sites, and said catalyst having been prepared by thoroughly and intimately blending finely-divided particles of said Components A, B, and C to provide a thoroughly-blended composite.

Suitable Group VIII noble metals that can be used in Component A are the platinum group metals of Group VIII of the Periodic Table of Elements. The platinum group metals include platinum, palladium, rhodium, ruthenium, osmium, and iridium. The preferred Group VIII noble metal is platinum. One or more Group VIII noble metals can be employed. The Group VIII noble metal is present in an amount within the range of about 0.1 wt% to about 3 wt%, calculated as the element and based upon the weight of Component A. Preferably, the Group VIII noble metal is present in an amount within the range of about 0.4 wt% to about 2 wt%, calculated as the element and based upon the weight of Component A.

Suitable non-noble metals of Group VIII that can be used in Component B are cobalt, nickel, and mixtures thereof. Cobalt is preferred. The non-noble metal of Group VIII is present in Component B in an amount within the range of about 0.1 wt% to about 4 wt%, calculated as the element and based upon the weight of Component B. Preferably, the cobalt, nickel, or mixture thereof is present in an amount within the range of about 0.2 wt% to about 3 wt%, calculated as the element and based upon the weight of Component B.

The gallium is present in Component C in an amount within the range of about 0.1 wt% to about 4 wt%, calculated as the element and based upon the weight of Component C. Preferably, the gallium is present in an amount within the range of about 0.2 wt% to about 3 wt%, calculated as the element and based upon the weight of Component C.

The catalyst support materials for Components A, B, and C can be the same material or can be different materials. The support material for each of these three components is a material that provides acidic catalytic sites. A typical support material for any or all of Components A, B, and C comprises a catalytically-active alumina and a combined halogen. Of course, the halogen can be either combined chlorine or combined fluorine. Preferably, the combined halogen is combined chlorine. The combined halogen is present in an amount within the range of about 0.1 wt% to about 4 wt%, calculated as the element and based upon the weight of the particular component. Preferably, the combined halogen is present in an amount within the range of about 0.4 wt% to about 1.5 wt%, calculated as the element and based upon the weight of the particular component.

A typical refractory inorganic oxide that can be used as a support material is a catalytically-active alumina, such as gamma-alumina, eta-alumina, or mixtures thereof. Such alumina should have an average pore diameter of about 7 nm (70 Angstrom units [Å]) to about 20 nm (200 Å), or larger. The alumina should have a surface area of at least 150 m$^2$/gm. Suitably, the surface area of the alumina should be within the range of about 200 m$^2$/gm to about 800 m$^2$/gm.

Other possible supports materials for one or more of the components of the catalyst of the present invention can be selected from boria-alumina, titania-alumina, alumina-silica, boria-titania-alumina, silica-magnesia, and a large-pore crystalline aluminosilicate material suspended in and distributed throughout a matrix of a refractory inorganic oxide, such as an alumina.

The catalyst of the present invention can be prepared typically by first forming each of the Components A, B, and C, thoroughly and intimately blending finely-divided particles of Components A, B, and C to provide a thoroughly-blended composite, and forming said composite into particles that are suitable for use in a hydrocarbon conversion reaction zone.

Component A is prepared by incorporating at least one Group VIII noble metal into the selected catalyst support material either by impregnation of that support material or by addition of a soluble compound of the metal to a sol or gel of the support material, if the support material is a refractory inorganic oxide, thoroughly blending the mixture, co-gelling the mixture, drying, and calcining. If a combined halogen is to be employed, it can be added in a similar manner. If both the Group VIII noble metal and the combined halogen are used, the halogen can be added prior to, after, or simultaneously with the Group VIII noble metal.

Similar techniques are employed in the preparation of either Component B or Component C for the addition of the particular metal being added thereto and the combined halogen, if used. Therefore, for either of these components, the particular metal and halogen, if used, can be impregnated into the support material or soluble compounds of the metal and the halogen can be added to a sol or gel of the refractory inorganic oxide. In the latter instance, the resulting composite is thoroughly blended, the sol or gel mixture is subsequently co-gelled by the addition of a dilute ammonia solution, and the resulting co-gelled material is dried and calcined.

In the case when the refractory inorganic oxide is gelled, dried, calcined, and cooled, and the resulting material is impregnated with one or more solutions of the various metal components and the halogen, if used, suitable calcination conditions comprise a temperature in the range of about 482° C. (900° F.) to about 593° C. (1,100° F.) and a calcination time within the range of about one hr to about 20 hr. Suitable drying conditions comprise a temperature in the range of about 93° C. (200° F.) to about 204° C. (400° F.) and a drying time of about three hr to about 30 hr. Preferably, drying conditions comprise a temperature of about 121° C. (250° F.) for about 8 hr to about 16 hr and calcination conditions comprise a temperature of about 538° C. (1,000° F.) for about 2 hr. The combined halogen should be incorporated into the catalyst as a halide of a metal, or as a halogen acid, or as a halide salt.

A mechanical mixture of finely-divided particles of Components A, B, and C is prepared. Appropriatelysized particles of each component, i.e., particles having a diameter that is less than 100 mesh [U.S. Sieve Series] (150 microns), are added to one another and are thoroughly blended to form a thoroughly-blended composite, which in turn is formed into particles that are suitable for use in a hydrocarbon conversion reaction zone. Typically, the latter particles have a size that is greater than 100 mesh [U.S. Sieve Series] (150 microns). The particles of Components A, B, and C can be thoroughly and intimately blended by using techniques, such as mulling or ball-milling, which are well-known in the art.

A suitable procedure for making such a finished catalyst comprises forming cylindrical pellets from the thoroughly-blended composite by extrusion and charging the extruded pellets into a Marumerizer, wherein the pellets are transformed into uniformly-sized spheres by means of a rolling motion resulting from centrifugal force and friction.

The Marumerizer (a registered trademark) is a machine consisting of a non-movable bowl inside of which bowl is a specially-machined rotating friction plate. It can be obtained from Elanco Products Company, Equipment Sales Department, a Division of Eli Lilly and Company.

It is to be understood that the use of a Marumerizer is suggested solely for illustrative purposes and is not intended to limit the scope of the present invention. Other methods known in the art can be used to form larger particles comprising a thoroughly-blended composite of smaller particles. The larger particles can be made in the shape of extrudates, pills, pellets, beads, spheres, or other shaped particles of the desired size.

The catalyst of the present invention can be used for the conversion of hydrocarbon streams. Specifically, it can be used to reform hydrocarbon streams. Suitably, it can be presulfided prior to its use according to sulfiding techniques recognized in the art.

Broadly, according to the present invention, there is provided also a process for the conversion of a hydrocarbon stream, which process comprises contacting said stream under hydrocarbon conversion conditions and in the presence of hydrogen with a catalyst comprising a physical particle-form mixture of a Component A, a Component B, and a Component C, said Component A comprising at least one Group VIII noble metal deposed on a solid catalyst support material providing acidic catalytic sites, said Component B comprising a non-noble metal of Group VIII selected from cobalt, nickel, and mixtures thereof deposed on a solid catalyst support material providing acidic catalytic sites, and said Component C comprising a small amount of gallium deposed on a solid catalyst support material providing acidic catalytic sites, said catalyst having been prepared by thoroughly and intimately blending finely-divided particles of said Components A, B, and C to to provide a thoroughly blended composite, each of said Components A, B, and C being present in an amount within the range of about 25 wt% to about 50 wt%, based upon the weight of said catalyst.

Particularly, there is provided a process for the reforming of a hydrocarbon stream, which process comprises contacting said stream under reforming conditions and in the presence of hydrogen with a catalyst comprising a physical particle-form mixture of a Component A, a Component B, and a Component C, said Component A comprising at least one Group VIII noble metal deposed on a solid catalyst support material providing acidic catalytic sites, said Component B comprising a non-noble metal of Group VIII selected from cobalt, nickel, and mixtures thereof deposed on a solid catalyst support material providing acidic catalytic sites, and said Component C comprising a small amount of gallium deposed on a solid catalyst support material providing acidic catalytic sites, said catalyst having been prepared by thoroughly and intimately blending finely-divided particles of said Components A, B, and C to provide a thoroughly-blended composite, each of said Components A, B, and C being present in an amount within the range of about 25 wt% to about 50 wt%, based upon the weight of said catalyst.

More particularly, there is provided a process for the reforming of a hydrocarbon stream, which process comprises contacting said stream under reforming conditions and in the presence of hydrogen with a catalyst comprising a physical particle-form mixture of a Component A, a Component B, and a Component C, said Component A comprising at least one Group VIII noble metal deposed on a solid catalyst support material providing acidic catalytic sites, said Component B comprising about 0.1 wt% to about 4 wt% non-noble metal of Group VIII selected from cobalt, nickel, and mixtures thereof, calculated as the element and based upon the weight of said Component B, deposed on a solid catalyst support material providing acidic catalytic sites, and said Component C comprising about 0.1 wt% to about 4 wt% gallium, calculated as the element and based upon the weight of said Component C, deposed on a solid catalyst support material providing acidic catalytic sites, said catalyst having been prepared by thoroughly and intimately blending finely-divided particles of said Components A, B, and C to provide a thoroughly-blended composite, each of said Components A, B, and C being present in an amount within the range of about 25 wt% to about 50 wt%, based upon the weight of said catalyst, and said Group VIII noble metal being present in an amount within the range of about 0.1 wt% to about 3 wt%, calculated as the element and based upon the weight of said Component A.

Typical operating conditions that can be used in the reforming process of the present invention comprise an inlet temperature of about 482° C. (900° F.) to about 549° C. (1,020° F.), a pressure of about 446 kPa (50 psig) to about 6,996 kPa (1,000 psig), a weight hourly space velocity (WHSV) of about 0.5 weight unit of hydrocarbon per hour per weight unit of catalyst to about 10 weight units of hydrocarbon per hour per weight unit of catalyst, a hydrogen addition rate of about 267 m$^3$/m$^3$ (1,500 SCFB) to about 2,670 m$^3$/m$^3$ (15,000 SCFB), and a hydrogen-to-hydrocarbon mole ratio within the range of about 1 to about 50. Preferred operating conditions comprise an inlet temperature of about 504° C. (940° F.) to about 527° C. (980° F.), a pressure of about 446 kPa (50 psig) to about 2,170 kPa (300 psig), a WHSV of about 1 weight unit of hydrocarbon per hour per weight unit of catalyst to about 8 weight units of hydrocarbon per hour per weight unit of catalyst, a hydrogen addition rate of about 534 m$^3$/m$^3$ (3,000 SCFB) to about 1,780 m$^3$/m$^3$ (10,000 SCFB), and a hydrogen-to-hydrocarbon mole ratio within the range of about 4 to about 25.

The process of the present invention can be carried out in any of the conventional types of equipment known in the art. One may, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultraforming (PETROLEUM ENGINEER, Vol. XXVI, No. 4, April, 1954, at page C-35). The reaction products from the foregoing processes are removed from the reaction zones and fractionated to recover the various components thereof. The hydrogen and unconverted materials are recycled as desired, the excess hydrogen produced in a reformer conveniently being utilized in the hydrodesulfurization of the feed, if such hydrodesulfurization is needed.

Unwanted products in the reforming of petroleum hydrocarbon streams are light hydrocarbon gases and coke. Such products and other compounds, such as polynuclear aromatics and heavy hydrocarbons, may result in coke. As the operation progresses, a substantial amount of coke accumulates on the surface of the catalyst resulting in an increasingly rapid rate of catalyst deactivation. Consequently, the coke must be removed periodically from the surface. Such coke removal may be acccomplished through a coke-burn treatment wherein the coked catalyst is contacted with an oxygen-containing gas at selected temperatures. Typically, the gas will contain oxygen within the range of about 1 vol% to about 21 vol%. The concentration of oxygen in the gas should be maintained at a level which will result in the production of temperatures that will not be in excess of 593° C. (1,100° F.), preferably, not in excess of 566° C. (1,050° F.).

Typically, the process of the present invention can be employed as a semi-regenerative reforming process or as a regenerative or cyclic process. In a semi-regenerative reforming process, the flow of hydrocarbons is stopped to all of the reactors in the system and the catalyst in each of the reactors is regenerated. In a regenerative or cyclic reforming system, one of the reactors is removed from the system and is replaced by an auxiliary reactor. Reforming of hydrocarbons continues in such a system. While catalyst in the reactor that has been removed from the system is regenerated. The auxiliary reactor is known as a swing reactor.

A preferred embodiment of the process of the present invention is depicted in the accompanying FIG. 1. This figure is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Consequently, such auxiliary equipment is not shown in the figure.

In the embodiment of the process of the present invention that is represented in the accompanying FIG. 1, a naphtha having a boiling range of about 71° C. (160° F.) to about 204° C. (400° F.), preferably, about 82° C. (180° F.) to about 193° C. (380° F.), is obtained from source 10. This naphtha contains 15 ppm sulfur. However, it could satisfactorily contain sulfur in an amount within the range of 0 ppm to about 80 ppm. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 504° C. (940° F.) to about 527° C. (980° F.). The outlet temperature of reactor 17 is approximately 427° C. (800° F.) and the pressure in reactor 17 is within the range of about 1,205 kPa (160 psig) to about 2,308 kPa (320 psig).

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is about 516° C. (960° F.) to about 538° C. (1,000° F.). The outlet temperature of reactor 21 is approximately 457° C. (855° F.) and the pressure in reactor 21 is within the range of about 1,067 kPa (140 psig) to about 2,170 kPa (300 psig).

The effluent from reactor 21 passes through line 22, furnace 23, and line 24 into the top of reactor 25. This effluent is heated in furnace 23 so that the inlet temperature of reactor 25 is about 516° C. (960° F.) to about 538° C. (1,000° F.). The outlet temperature of reactor 25 is approximately 504° C. (940° F.) and the pressure in reactor 25 is within the range of about 929 kPa (120 psig) to about 2,032 kPa (280 psig).

The effluent from reactor 25 passes through line 26, furnace 27, and line 28 into the top of reactor 29. This hydrocarbon effluent is heated in furnace 27 so that the inlet temperature of reactor 29 is about 527° C. (980° F.) to about 549° C. (1,020° F.). The outlet temperature of reactor 29 is about 510° C. (950° F.) and the pressure in reactor 29 is within the range of about 791 kPa (100 psig) to about 1,894 kPa (260 psig).

Reactors 17, 21, 25, and 29 all contain a catalyst which has been presulfided and which comprises a physical particle-form mixture of Components A, B, and C, said Component A comprising about 0.1 wt% to about 3 wt% platinum and about 0.1 wt% to about 4 wt% combined chlorine deposed on gamma-alumina, said Component B comprising about 0.1 wt% to about 4 wt% cobalt and about 0.1 wt% to about 4 wt% combined chlorine deposed on gamma-alumina, and said Component C comprising about 0.1 wt% to about 4 wt% gallium and about 0.1 wt% to about 4 wt% combined chlorine deposed on gamma-alumina. Component B could contain nickel rather than cobalt, or it could contain a mixture of these two metals. The Components A, B, and C are present in equal amounts. In this case, the three components contain the same amount of combined chlorine. The amounts of the metals and the combined chlorine are expressed in terms of the elements and are based upn the weight of the particular component. The particles are 1/16-inch × 1/16-inch pellets.

Not shown in the figure is a fifth reactor, which reactor contains a quantity of the catalyst that is employed in the other reactors. This additional reactor is employed as a swing reactor for each of the four reactors in this system, when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges and values as expressed hereinabove.

The effluent from reactor 29 passes through line 30, water cooler 31, and line 32 into gas-liquid separator 33. Gas-liquid separator 33 is operated at a pressure of about 653 kPa (80 psig) to about 1,756 kPa (240 psig) and at a temperature of about 38° C. (100° F.). Liquid product is removed from separator 33 through line 34 to be sent to a suitable product recovery system from which a high-octane product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through lines 38 and 14 as hydrogen-hydrocarbon recycle gas. When necessary, make-up hydrogen gas may be introduced into the system from source 39 via line 40.

It is contemplated that in a second embodiment of the process of the present invention, which second embodiment can be represented also by the simplified schematic flow diagram depicted in FIG. 1, two catalysts are employed. In this second embodiment, reactors 17 and 21 contain a first catalyst, which first catalyst comprises about 0.05 wt% to about 1 wt% platinum, about 0.1 wt% to about 1 wt% combined halogen, preferably, chlorine, and, optionally, about 0.1 wt% to about 1 wt% rhenium, on an alumina carrier, and reactors 25 and 29 contain a second catalyst, which second catalyst is an embodiment of the catalyst of the process of the present invention as described hereinabove. The swing reactor (not shown) employs either the second catalyst or a mixture of the two catalysts. The operating conditions employed in this embodiment fall within the ranges of values set forth hereinabove. In this latter embodiment, either a virgin naphtha or a partially-reformed hydrocarbon stream may be employed as the hydrocarbon feedstock.

The following examples are presented to facilitate a better understanding of the present invention. They are presented for the purpose of illustration only and are not intended to limit the scope of the present invention.

EXAMPLE I

An embodiment of the catalyst of the present invention was prepared in the laboratory. This catalyst is identified hereinafter as Catalyst I.

Component A of Catalyst I was prepared by impregnating 225 gm of gamma-alumina, obtained from the American Cyanamid Company, with a solution that had been prepared by dissolving 9.23 gm of chloroplatinic acid ($H_2PtCl_6$) in sufficient distilled water to furnish 180 gm of solution. The alumina was in the form of 325-mesh material ($-325$ mesh), that is, material that would pass through a 325-mesh screen (U.S. Sieve Series). Impregnation of the alumina was conducted in an Agglo-Miser laboratory pelletizer obtained from Mars Mineral Corporation. Such impregnation involved dropwise addition of the solution and employed the incipient wetness technique, i.e., just enough solution was employed to fill the pores of the support material. The impregnated material was dried in static air overnight (about 16 hr) at a temperature of 121° C. (250° F.) and then calcined in air for 3 hr at a temperature of 538° C. (1,000° F.).

Component B of Catalyst I was prepared by impregnating 225 grams of gamma-alumina ($-325$ mesh), obtained from the American Cyanamid Company, with a solution that had been prepared by dissolving 12.72 gm of cobalt chloride ($CoCl_2.6H_2O$) in sufficient distilled water to furnish 180 gm of solution. Impregnation of this alumina was also conducted in the Agglo-Miser laboratory pelletizer as described hereinabove. The impregnated material was dried and calcined as described hereinabove for Component A.

Component C of Catalyst I was prepared by impregnating 225 gm of gamma-alumina ($-325$ mesh), obtained from the American Cyanamid Company, with a solution that had been prepared by dissolving 24.28 gm of gallium nitrate [$Ga(NO_3)_3.9H_2O$] and 1.86 gm of concentrated hydrochloric acid solution, approximately 37% hydrochloric acid, obtained from Sargent-Welch Scientific Company, in sufficient distilled water to furnish 180 gm of solution. Again the impregnation was conducted in the Agglo-Miser laboratory pelletizer as described hereinabove and the impregnated material was dried and calcined as defined hereinabove for Component A.

Catalyst I was then obtained by combining 200-gm portions of Components A, B, and C, mixing the combined powders of the three components in the Agglo-Miser laboratory pelletizer for 1½ hr, adding 390 gm of distilled water dropwise to the mixture in the Agglo-Miser laboratory pelletizer, mulling the mixture for 14 min in a Speed Mullor laboratory mixer obtained from the Beardsley & Piper Division of Pettibone Corporation. Since the mixture appeared to be too dry, 25 gm of distilled water were added thereto and mixing was conducted for 3 min. Subsequently, an additional 25 gm of distilled water were added to the mixture and the resulting composite was mulled for 3 min. Then the mulled composite was extruded twice and marumerized. The extrudates, approximately 1/16-inch×¼-inch in size were introduced into a Marumerizer and were transformed in the Marumerizer into uniformly-sized spheres by means of a rolling motion resulting from centrifugal force and friction.

Since the marumerized material appeared to be too wet, it was dried in air for 5 min at a temperature of approximately 149° C. (300° F.). Then it was extruded twice again. Since the material stuck in the extruder during the second extrusion, it was extruded twice again and marumerized. All large particles were extruded and marumerized again. The material was dried overnight (approximately 16 hr) in air at a temperature of 121° C. (250° F.) and calcined for 3 hr in air at a temperature of about 538° C. (1,000° F.). Calcination was started on a Saturday, but was not finished. Therefore, the material which had been dried overnight was redried in air for 7 hr at a temperature of 121° C. (250° F.) prior to the calcination. The calcined catalyst material was Catalyst I.

EXAMPLE II

A comparative catalyst containing platinum, cobalt, and gallium, all on each support particle, was prepared by co-gelling techniques. This catalyst is identified hereinafter as Catalyst II.

First, a solution containing platinum, cobalt, and gallium was made up by adding 1.9 gm cobalt chloride ($CoCl_2.6H_2O$), 1.36 gm chloroplatinic acid ($H_2PtCl_6$), and 3.60 gm of gallium nitrate [Ga(NO$_3$)$_3$.9H$_2$O] to sufficient distilled water to furnish 80 gm of solution. Then a 100-gm portion of gamma-alumina, obtained from the American Cyanamid Company, in the form of 20/45-mesh material, i.e., material that would pass through a 20-mesh screen (U.S. Sieve Series), but be retained on a 45-mesh screen (U.S. Sieve Series), was added to the solution in an evaporating dish and the resulting composite was thoroughly mixed, dried overnight (approximately 16 hr) in air at a temperature of 121° C. (250° F.), and calcined in air for three hr at a temperature of 538° C. (1,000° F.). The calcined material was the finished Catalyst II.

EXAMPLE III

Another comparative catalyst was used. This catalyst, hereinafter identified as Catalyst III, was a catalyst containing platinum and rhenium and was prepared commercially by the American Cyanamid Company. It contained 0.37 wt% platinum, 0.37 wt% rhenium, and 0.72 wt% combined chlorine.

EXAMPLE IV

Each of the Catalysts I, II, and III was tested in a bench-scale pilot unit for its ability to reform a desulfurized Midcontinent naphtha, hereinafter identified as Feed A, which was essentially free of sulfur. In addition, each of Catalyst I and II was tested for its ability to reform a naphtha containing 58 ppm (wt) of sulfur, which naphtha is identified hereinafter as Feed B. Feed B was Feed A to which sufficient sulfur in the form of thiophene had been added to provide the 58 ppm sulfur. The properties of Feed A are presented hereinafter in Table I.

TABLE I

| PROPERTIES OF FEED A | |
|---|---|
| Gravity, °API | 54.9 |
| Specific Gravity | 0.7599 |
| Hydrogen, wt % | 14.11 |
| Carbon, wt % | 85.60 |
| Coulometric Sulfur, ppm | <0.1 |
| Chemiluminescence Nitrogen, ppm | 0.5 |
| Coulometric Chlorine, ppm | 1.7 |
| Hydrocarbon Type, vol % | |
| Paraffins | 45.5 |
| Naphthenes | 40.1 |
| Aromatics | 14.4 |
| Research Octane No. | 53.1 |
| ASTM Distillation, °F. (°C.) | |
| IBP  204 | (95) |
| 5%  226 | (108) |
| 10  232 | (111) |
| 20  239 | (115) |
| 30  249 | (121) |
| 40  258 | (126) |
| 50  268 | (131) |
| 60  278 | (137) |
| 70  290 | (143) |
| 80  303 | (151) |
| 90  321 | (161) |
| 95  337 | (170) |
| EP  386 | (197) |

Each test was conducted in a bench-scale test unit employing an isothermal fixed bed of catalyst. The hydrocarbon feedstock and once-through hydrogen were mixed and the resulting hydrogen-hydrocarbon mixture was charged to a reactor having an inside diameter of ½ inch. The reactor, which was 17¾ inches long, was immersed in a hot salt bath containing Hitec (a registered trade name). The temperatures in the reactor were determined by employing a manually-operated concentric thermocouple, which was movable along the length of the reactor. The hydrocarbon feed was pumped by a positive-displacement Ruska pump. The liquid product was collected in a pressure receiver and was weighed and analyzed on a Hewlett-Packard research chromatograph, Model 5830A. The gas yield was measured by a wet test meter and analyzed with a Varian Aerograph chromatograph, Series 1200.

Each catalyst was charged to a reactor in the form of 20/45-mesh material, i.e., material that would pass through a 20-mesh screen (U.S. Sieve Series), but would be retained on a 45-mesh screen (U.S. Sieve Series). The catalyst bed was supported on a layer of 6.5 ml of 3-mm glass beads.

After the reactor containing the catalyst was placed in the test unit, the catalyst was pretreated. The reactor was purged with nitrogen and air was passed through the reactor at a rate of 0.000241 m$^3$/hr (0.0085 ft$^3$/hr) for a period of time within the range of 1 hr to 2½ hr. During this air soak, the temperature was raised from 343° C. (650° F.) to approximately 499° C. (930° F.) and held at the latter temperature for about 1 hr. The air soak was followed sequentially by a nitrogen purge, a sulfiding treatment, and a reduction of the catalyst with hydrogen. The hydrogen flow rate was carried out at 0.0552 m$^3$/hr (1.95 ft$^3$/hr). The sulfiding was conducted for 1 min by means of a gas mixture comprising 8 vol% hydrogen sulfide in hydrogen at a temperature of 499° C. (930° F.) and a pressure of 170 kPa (10 psig). After the sulfiding treatment, the reactor was purged with nitrogen, the hydrogen flow was re-established at a flow rate of 0.0552 m$^3$/hr (1.95 ft$^3$/hr), and the catalyst was reduced with hydrogen for 1 hr at a temperature of 499° C. (930° F.). Test pressure was set and the run was conducted at the following operating conditions: a reaction temperature of 499° C. (930° F.); a pressure of 2,170 kPa (300 psig); a WHSV of 2.3 gm of hydrocarbon per hour per gm of catalyst; and a hydrogen-to-hydrocarbon mole ratio of 5. A 20-gm sample of catalyst was employed in each case.

The feedstocks and the loadings of the catalysts for the various tests are summarized hereinbelow in Table II.

TABLE II

| CATALYST AND FEED SUMMARY | | |
|---|---|---|
| Test No. | Catalyst | Feed |
| 1 | III | A |
| 2 | III | A |
| 3 | II | A |
| 4 | I | A |
| 5 | I | B |
| 6 | II | B |

The research octane numbers for Tests Nos. 1, 2, 3, and 4 were estimated by gas-chromatographic techniques. The research octane numbers for Tests Nos. 5 and 6 were measured by means of a Model 81-L Laboratoty Octane Analyzer obtained from Foxboro Analytical, a division of the Foxboro Company.

The results obtained from Tests Nos. 1 and 2 are presented in Table III hereinbelow; from Test No. 3, in Table IV; from Test No. 4, in Table V; from Test No. 5, in Table VI; and from Test No. 6, in Table VII. In addition, the research octane numbers obtained with Feed A (Tests Nos. 1, 3, and 4) are shown in FIG. 2, while the liquid yields obtained with Feed A (Tests Nos. 1, 2, 3, and 4) are plotted in FIG. 3. The research octane numbers obtained with Feed B (Tests Nos. 5 and 6) are given in FIG. 4, and the liquid yields obtained with Feed B (Tests Nos. 5 and 6) are shown in FIG. 5. The research octane numbers indicate the activities of the catalysts.

TABLE NO. III

DATA OBTAINED WITH CATALYST III AND FEED A

| Test No. | Hours On Oil | Research Octane No. | Liquid Yield, wt % |
|---|---|---|---|
| 1 | 1.0 | 99.2 | 71.0 |
| 1 | 10.2 | 99.4 | 81.1 |
| 1 | 20.4 | 99.7 | 79.2 |
| 1 | 24.1 | 99.6 | 81.8 |
| 1 | 34.1 | 99.6 | 81.1 |
| 1 | 44.2 | 99.4 | 80.6 |
| 1 | 47.9 | 99.4 | 81.8 |
| 1 | 57.8 | 99.3 | 78.0 |
| 1 | 68.0 | 99.3 | 81.5 |
| 2 | 1.2 | 98.4 | 77.8 |
| 2 | 10.7 | 99.1 | 82.4 |
| 2 | 21.2 | 99.6 | 81.5 |
| 2 | 24.9 | 99.5 | 81.4 |
| 2 | 34.5 | 97.0 | 81.7 |
| 2 | 44.1 | 101.0* | 79.1 |
| 2 | 47.7 | 102.0* | 77.9 |
| 2 | 58.3 | 101.9* | 78.7 |
| 2 | 68.4 | 101.8* | 77.9 |
| 2 | 71.6 | 102.1* | 74.0 |

*Catalyst bed temperature was about 507° C. (945° F.)

TABLE IV

DATA OBTAINED WITH CATALYST II AND FEED A IN TEST NO. 3

| Hours on Oil | Research Octane No. | Liquid Yield, wt % |
|---|---|---|
| 8.4 | 101.9 | 75.4 |
| 18.8 | 101.9 | 77.9 |
| 22.4 | 101.8 | 78.3 |
| 30.8 | 101.9 | 77.6 |
| 39.6 | 102.1 | 76.5 |
| 43.2 | 101.9 | 78.3 |
| 53.1 | 101.8 | 77.9 |
| 63.3 | 101.9 | 78.4 |
| 67.1 | 101.7 | 79.6 |
| 77.0 | 101.7 | 78.1 |
| 87.1 | 101.7 | 78.5 |

TABLE V

DATA OBTAINED WITH CATALYST I AND FEED A IN TEST NO. 4

| Hours on Oil | Research Octane No. | Liquid Yield, wt % |
|---|---|---|
| 8.2 | 102.1 | 76.8 |
| 18.3 | 101.5 | 79.3 |
| 22.1 | 101.3 | 79.6 |
| 32.0 | 101.7 | 78.4 |
| 42.0 | 101.8 | 79.0 |
| 45.9 | 101.5 | 80.6 |
| 55.8 | 101.7 | 78.1 |
| 65.9 | 101.6 | 79.0 |
| 69.6 | 101.5 | 79.9 |

TABLE VI

DATA OBTAINED WITH CATALYST I AND FEED B IN TEST NO. 5

| Hours on Oil | Research Octane No. | Liquid Yield, wt % |
|---|---|---|
| 8.3 | 102.1 | 72.9 |
| 18.7 | 101.3 | 75.0 |
| 27.0 | 101.5 | 74.1 |
| 44.6 | 101.0 | 72.3 |
| 56.4 | 100.5 | 72.5 |
| 68.0 | 100.0 | 72.0 |

TABLE VII

DATA OBTAINED WITH CATALYST II AND FEED B IN TEST NO. 6

| Hours on Oil | Research Octane No. | Liquid Yield, wt % |
|---|---|---|
| 8.1 | 100.1 | 71.6 |
| 19.9 | 99.6 | 70.0 |
| 31.8 | 98.2 | 71.0 |
| 43.7 | 97.8 | 70.3 |
| 55.6 | 97.4 | 70.4 |
| 67.7 | 96.9 | 69.5 |
| 79.3 | 96.7 | 73.0 |

The data show that when reforming the essentially sulfur-free naphtha, i.e., Feed A, the catalysts containing the platinum, cobalt, and gallium, Catalysts I and II, are more active than the conventional platinum-rhenium catalyst, Catalyst III, but that the method of catalyst preparation of the catalysts containing the platinum, cobalt, and gallium does not result in either substantially different octane numbers or substantially different yields.

On the other hand, the catalyst of the present invention, i.e., the catalyst wherein the platinum, cobalt, and gallium had been impregnated on separate and different support particles, Catalyst I, furnished both activity and yields that were superior to those provided by the catalyst having the three metals on each and every support particle, Catalyst II, when each catalyst was employed to reform Feed B, a naphtha containing 58 ppm sulfur. This is surprising and unexpected, since the art, namely, Antos in U.S. Pat. No. 4,048,249, suggests that a catalyst containing these metals provides particularly good results when the catalyst is prepared and maintained in a substantially sulfur-free state and is used in a substantially sulfur-free environment.

Contrary to this teaching in the prior art, the catalyst of the present invention provided superior reforming performance even though it was presulfided and was used in an environment containing sulfur.

What is claimed is:

1. A process for the conversion of a hydrocarbon stream, which process comprises contacting said stream under hydrocarbon conversion conditions and in the presence of hydrogen with a catalyst comprising a physical particle-form mixture of a Component A, a Component B, and a Component C, said Component A comprising at least one Group VIII noble metal deposed on a solid catalyst support material providing acidic catalytic sites, said Component B comprising a non-noble metal of Group VIII selected from cobalt, nickel, and mixtures thereof deposed on a solid catalyst support material providing acidic catalytic sites, and said Component C comprising a small amount of gallium deposed on a solid catalyst support material providing acidic catalytic sites, said catalyst having been prepared by thoroughly and intimately blending finely-divided particles of said Components A, B, and C to provide a thoroughly-blended composite, each of said Components A, B, and C being present in an amount within the range of about 25 wt% to about 50 wt%, based upon the weight of said catalyst.

2. The process of claim 1, which process is a process for the reforming of a hydrocarbon stream and which process comprises contacting said stream under reforming conditions and in the presence of hydrogen with said catalyst.

3. The process of claim 2, wherein the solid catalyst support material for each of Components A, B, and C comprises a catalytically-active alumina containing a combined halogen and said halogen is present in an amount within the range of about 0.1 wt% to about 4 wt%, calculated as the element and based upon the weight of the particular component, said Group VIII noble metal of said Component A is platinum and said platinum is present in an amount within the range of about 0.1 wt% to about 3 wt%, calculated as the element and based upon the weight of said Component A, said non-noble metal of Group VIII is cobalt and said cobalt is present in an amount within the range of about 0.1 wt.% to about 4 wt.%, calculated as the element and based upon the weight of said Component B, and said gallium is present in an amount within the range of about 0.1 wt.% to about 4 wt.%, calculated as the element and based upon the weight of said Component C.

4. The process of claim 2, wherein said reforming conditions comprise an inlet temperature of about 482° C. (900° F.) to about 549° C. (1,020° F.), a pressure of about 446 kPa (50 psig) to about 6,996 kPa (1,000 psig), a WHSV of about 0.5 weight unit of hydrocarbon per hour per weight unit of catalyst to about 10 weight units of hydrocarbon per hour per weight unit of catalyst, a hydrogen addition rate of about 267 m$^3$/m$^3$ (1,500 SCFB) to about 2,670 m$^3$/m$^3$ (15,000 SCFB) and a hydrogen-to-hydrocarbon mole ratio within the range of about 1 to about 50.

5. The process of claim 3, wherein said reforming conditions comprise an inlet temperature of about 482° C. (900° F.) to about 549° C. (1,020° F.), a pressure of about 446 kPa (50 psig) to about 6,996 kPa (1,000 psig), a WHSV of about 0.5 weight unit of hydrocarbon per hour per weight unit of catalyst to about 10 weight units of hydrocarbon per hour per weight unit of catalyst, a hydrogen addition rate of about 267 m$^3$/m$^3$ (1,500 SCFB) to about 2,670 m$^3$/m$^3$ (15,000 SCFB), and a hydrogen-to-hydrocarbon mole ratio within the range of about 1 to about 50.

6. The process of claim 3, wherein said halogen is chlorine.

7. The process of claim 6, wherein said platinum of said catalyst is present in an amount within the range of about 0.4 wt% to about 2 wt%, calculated as the element and based upon the weight of Component A, said cobalt of said catalyst is present in an amount within the range of about 0.2 wt% to about 3 wt%, calculated as the element and based upon the weight of Component B, said gallium of said catalyst is present in an amount within the range of about 0.2 wt% to about 3 wt%, calculated as the element and based upon the weight of Component C, and said chlorine of said catalyst is present in an amount within the range of about 0.4 wt% to about 1.5 wt%, calculated as the element and based upon the weight of the particular component.

8. The process of claim 6, wherein said reforming conditions comprise an inlet temperature of about 482° C. (900° F.) to about 549° C. (1,020° F.), a pressure of about 446 kPa (50 psig) to about 6,996 kPa (1,000 psig), a WHSV of about 0.5 weight unit of hydrocarbon per hour per weight unit of catalyst to about 10 weight units of hydrocarbon per hour per weight unit of catalyst, a hydrogen addition rate of about 267 m$^3$/m$^3$ (1,500 SCFB) to about 2,670 m$^3$/m$^3$ (15,000 SCFB), and a hydrogen-to-hydrocarbon mole ratio within the range of about 1 to about 50.

9. The process of claim 7, wherein said reforming conditions comprise an inlet temperature of about 504° C. (940° F.) to about 527° C. (980° F.), a pressure of about 446 kPa (50 psig) to about 2,170 kPa (300 psig), a WHSV of about 1 weight unit of hydrocarbon per hour per weight unit of catalyst to about 8 weight units of hydrocarbon per hour per weight unit of catalyst, a hydrogen addition rate of about 534 m$^3$/m$^3$ (3,000 SCFB) to about 1,780 m$^3$/m$^3$ (10,000 SCFB), and a hydrogen-to-hydrocarbon mole ratio within the range of about 4 to about 25.

10. The process of claim 8, wherein said stream contains up to 80 ppm sulfur and is a member selected from the group consisting of a virgin naphtha, a cracked naphtha, a hydrocarbon fraction boiling in the gasoline boiling range, and mixtures thereof.

11. The process of claim 9, wherein said stream contains up to 80 ppm sulfur and is a member selected from the group consisting of a virgin naphtha, a cracked naphtha, a hydrocarbon fraction boiling in the gasoline boiling range, and mixtures thereof.

* * * * *